S. L. WIEGAND.
VALVES.
No. 191,500. Patented May 29, 1877.
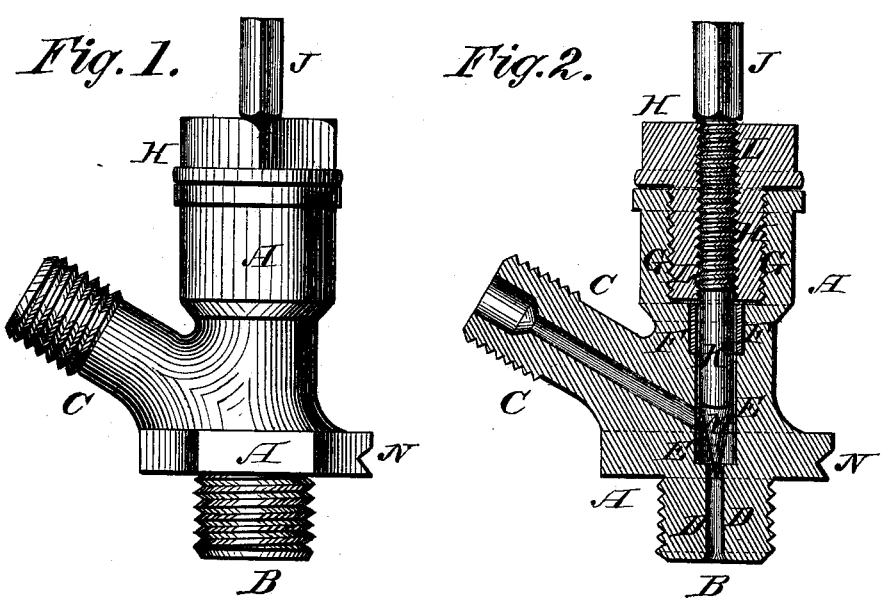
WITNESSES:
George Poe Jr.
Ralston Cox
INVENTOR:
S. Lloyd Wiegand

UNITED STATES PATENT OFFICE.

S. LLOYD WIEGAND, OF PHILADELPHIA, PENNSYLVANIA, ASSIGNOR TO SAMUEL S. WHITE, OF SAME PLACE.

IMPROVEMENT IN VALVES.

Specification forming part of Letters Patent No. 191,500, dated May 29, 1877; application filed April 26, 1877.

*To all whom it may concern:*

Be it known that I, S. LLOYD WIEGAND, of the city and county of Philadelphia, State of Pennsylvania, have invented a new and useful Improvement in Valves for retaining and regulating the flow of gas and fluids under high pressures; and I do hereby declare the following to be a sufficiently full, clear, and exact description thereof to enable those skilled in the art to make and use the same.

The nature of my invention consists in arranging the screw and nut which operates the plug of the valve so that they are protected by a packing from contact with the fluid when the valve is open, and thus avoid the sticking fast of the screw in the nut by corrosion, and also in forming the nut through which the plug-screw works with an external thread, turning in a reverse direction from the plug-screw, so that should the plug-screw ever become fast in the nut, the nut itself may be turned and caused to operate the plug, thus preventing a waste of the contents of the vessel. The nut may also answer the purpose of a gland for retaining the packing around the plug.

I will now proceed to more particularly describe my invention, referring in so doing to the drawing annexed, and letters of reference marked thereon, and forming a part of this specification.

Figures 1 and 2, respectively, show an elevation and vertical section.

The same letters apply to the same parts in the two figures.

A represents the body of the valve, screwed at B, the lower end, for insertion into the vessel or tube with which it is to be used, and provided with a branch, C, screwed so as to adapt it to couplings or tubes. The body A has an aperture through it, in its axial line, small at its lower end, and marked D, chambered or enlarged farther up at E, with another enlargement at F, and a still further enlargement at G.

The portion G is provided with an internal screw-thread, preferably left-handed, in which fits a male screw, H, provided with prismatic head, adapted to be turned by a wrench.

Through the plug H is screwed the plug-screw J, threaded in a direction opposite to that of the external thread on the screw H. The head of the plug-screw J is made prismatic, so as to fit a suitable key or wrench, and the part K below the screw-thread L is made cylindric, and, passing through a packing in the chamber F, fits accurately in the chamber E, and terminates in a cone, M, which, entering the small part of the bore D, serves as a valve or stopper, and can be raised and lowered, either by turning the screw J or by turning the screw H, and is guided accurately to and from its seat by the cylindric part K.

The branch C has a perforation made centrally through it, reaching into the lower part of the chamber E, and is counterbored to receive a tubulure on the end of the coupling, or a tube into which the gas or fluid is drawn, and hold it in central position. A depression is made at N on the valve-body, in the axial line of the branch C, upon which a clamp bears for the purpose of holding the branch tightly to the supplying-tube when the vessel to which the valve is applied is being charged. In this way the screw-threads on the branch C are used only under the moderate pressure at which the gas is emptied, and is not strained or worn by being used under the high pressure requisite to charge the vessels to which the valves are applied.

The packing in the chamber F is held down by the screw H, and serves to protect the screw L and its nut from corrosion by contact with gas or other fluid.

A cupped leather packing may sometimes be substituted for the packing in the chamber F.

Having described my invention, what I claim therein as new and useful is—

In combination with the casing, having the packing-chamber F, the concentric screws, turning in opposite directions, and the valve M, having screw-threaded stem J K, substantially as and for the purpose set forth.

S. LLOYD WIEGAND.

Witnesses:
FRANK F. THOMPSON,
J. DANIEL EBY.